3,481,355
PLANT SANITIZING SYSTEM
Olin L. Watson, Raleigh, and Charles W. Titus, Knightdale, N.C., assignors to Watson Seafood & Poultry Co., Inc., Raleigh, N.C.
Filed Apr. 18, 1967, Ser. No. 631.834
Int. Cl. G05d 11/00; B08b 3/00; E03c 1/046
U.S. Cl. 137—93                                        18 Claims

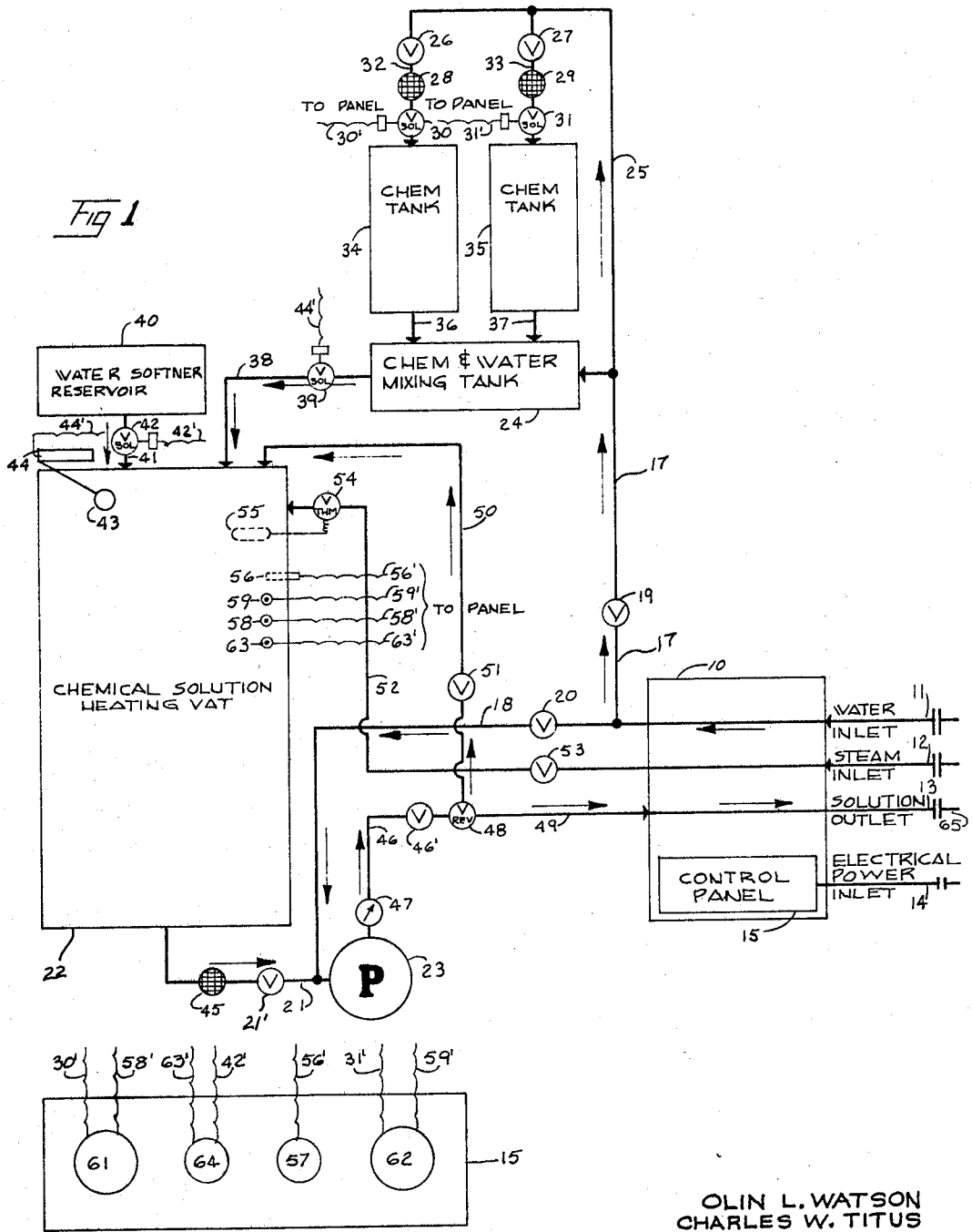

ABSTRACT OF THE DISCLOSURE

In abstract, a preferred embodiment of this invention is a cleaning system for poultry and similar types of industrial food processing plants.

This invention relates to sanitizing systems and more particularly to cleaning and sterilizing systems for industrial type food processing plants.

Industrial food processing plants have always been faced with the difficult problem of maintaining adequate sanitation to prevent the products which they are treating or producing from becoming dangerously contaminated by accumulated waste products in or around the handling or processing equipment or adjacent area thereto. In recent years, these problems have been compounded by much more stringent health and sanitary regulations, particularly for the processors who, due to their sales in interstate commerce require full time Government inspectors in their plants.

To meet the health and sanitation requirements, an almost standard clean-up procedure has been developed in the food processing industry whereby when each shift of operation is completed, a cleaning crew comes in and places drum type containers at spaced predetermined locations through the plant. Next a pump is placed on or adjacent each container and a source of hot water is connected to the input side thereof. Each pump is then operated in such a manner as to force the cleaning substances within its associated container out under high pressure through a hand manipulated nozzle which is used to clean the limited area, including machinery, adjacent thereto. This system of sanitizing a plant however is extremely costly in that large amounts of detergents and other cleaning substances are wasted due to inaccurate measurements and the use of hand manipulated cleaning hoses. Further, the labor and time involved in accomplishing adequate clean-up to meet sanitation regulations and inspection requirements are extremely high and, at best, unreliable as to final results.

The present invention has been developed after much research and study into the above mentioned problems and is designed to reduce the cleaning and rinsing chemicals to a minimum as well as the labor required during clean-up process while at the same time giving not only a much better cleaning job but also increasing reliability due to standardizing the end results.

It is, therefore, an object of the present invention to provide a plant sanitizing system having accurate means for metering into, and thereby controlling, the quantity of chemicals added to the carrier fluid during plant cleaning process.

Another object of the present invention is to provide a plant cleaning system which is simple to install and operate while at the same time incorporating means for accurately controlling the cleaning and rinsing chemicals used therein thereby obtaining maximum use and benefit from such chemicals.

A further object of the present invention is to provide a method for sanitizing a food processing plant including the steps of adding chemicals for cleaning and sanitizing the plant, mixing the same in a vat in the presence of live steam and conveying the now prepared cleaning fluid to the portion of the plant to be sanitized thereby giving a continuous availability of a cleaning fluid of accurate predetermined composition at all desired locations within the plant.

Another object of the present invention is to provide a cleaning system which may be prefabricated to the point that, by connecting a water intake line, a steam intake line, a cleaning fluid outlet line and a source of electrical power, it may be operated to sanitize a plant.

Another object of the present invention is to provide a plant cleansing and sanitizing system which may be used in conjunction with nozzle jigs of predetermined size and shape thereby allowing more accurate and complete cleaning at reduced cost by eliminating hand manipulated cleaning hoses.

Other objects and advantages of the present invention will become apparent and obvious from a study of the following description and the accompanying drawings which are merely illustrative of the present invention.

In the drawings:

FIG. 1 is a schematic drawing showing a preferred embodiment of the present invention; and FIG. 2 is a diagrammatic view of a control panel of the type which could be used in conjunction with the system of the present invention.

With further reference to the drawings, a control block 10 of any convenient size and shape is provided having a water inlet connection 11, a system inlet connection 12, a cleaning solution outlet connection 13 and an electrical power inlet connection 14.

The electrical power inlet is operatively connected to a control panel 15 which in turn, through the electrical circuitry to be hereinafter described, controls valves for accurately feeding predetermined amount of selected chemicals into a vat for producing a cleaning solution of accurate and constant chemical composition.

Water line 16 leaves control block 10 and forks into water lines 17 and 18 in which hand valves 19 and 20 are provided respectively. Water line 18 is operatively connected to chemical solution heating vat outlet line 21 which communicatively connects the lower portion of chemical solution heating vat 22 to high pressure pump 23.

Water line 17 passes into chemical and water mixing tank 24. Water line 25 branches off of line 17 prior to its entering the chemical and water mixing tank and communicatively connects with valves 26 and 27. Each of these valves respectively communicates with strainers 28 and 29. Solenoid valves 30 and 31 are operatively connected in lines 32 and 33 below strainers 28 and 29. The ends of water lines 32 and 33 terminate respectively in chemical tanks 34 and 35.

Communicatively connecting chemical tanks 34 and 35 respectively to chemical and water mixing tank 24 are solution lines 36 and 37.

Solution line 38 connects mixing tank 24 to heating vat 22. A solenoid valve 39 is provided in line 38 to control the flow therethrough.

A water softener reservoir 40 is provided which is communicatively connected to heating vat 22 by way of line 41 which has mounted therein a solenoid valve 42.

A ball type float 43 is provided in the upper portion of heating vat 22 and is in operative engagement with microswitch 44 which in turn is operatively connected to solenoid valve 39 in solution line 38.

Below heating vat 22, in outlet line 21, is a strainer 45. Also in line 21 between said strainer and the junction of line 18 is a valve 21'.

The high pressure outlet line 46 from pump 23 has a pressure gauge 47 mounted therein. A relief valve 48 is provided between high pressure line 46 and cleaning solution outlet line 49 with a blow off line 50 leading back into heating vat 22. A hand valve 51 is provided in blow off line 50.

Steam inlet connection 12 is communicatively connected to chemical solution heating vat 22 by way of steam line 52 which has mounted therein hand valve 53 and thermostatic valve 54. A temperature bulb 55 is placed in the interior of heating vat 22 and is used to control thermostatic valve 54.

A temperature sensing bulb 56 is mounted within heating vat 22 and is operatively connected by way of electrical line 56' to temperature gauge 57 of control panel 15.

A pair of chemical concentration sensing bulbs 58 and 59 are mounted in the interior of chemical solution heating vat 22 and are connected respectively to solution conttrols 61 and 62 of panel 15 by way of electrical lines 58' and 59'. Also connected to solution controls 61 and 62 respectively by way of electrical lines 30' and 31' are solenoid valves 30 and 31.

A third chemical concentration sensing bulb 63 is provided within chemical solution heating vat 22 and is operatively connected by way of electrical line 63' to water softener solution control 64 of panel 15. A second electrical line 42' operatively connects solenoid valve 42 with water softener solution control 64.

Although a chemical concentration sensing bulb has been described in connection with the water softener control, it is obvious that this compound may be metered in accordance with the amount of water being used by the system or it can be controlled by any other convenient mode of determining the desired amount to be used.

Steam line 52 communicates with the interior of chemical solution heating vat 22 and continues preferably in a double steam coil from the upper portion of said vat to the lower portion thereof and terminates open to the solution within such vat.

In actual operation of the plant sanitizing system of the present invention, the above described system of lines, tanks and controls are installed in a plant and water inlet 11, steam inlet 12, solution outlet 13 and electrical inlet 14 are all connected to pre-existing lines. The device is then placed in operation by closing hand valve 20 (which is used only during the rinse cycle) and opening hand valve 19 which allows water to flow directly into chemical and water mixing tank 24 as well as through solenoid valves 30 and 31 into chemical tanks 34 and 35. This water entering these two chemical tanks forces the chemical therein through lines 36 and 37 respectively and into chemical and water mixing tank 24. The thus mixed chemicals and water pass through line 38 into chemical solution heating vat 22. When this vat has reached its capacity, ball type float 43 closes microswitch 44 which in turn closes solenoid valve 39 thereby stopping the flow of liquid to the heating vat until some of the solution therein is removed.

Once the heating vat has been filled, valve 53 is opened to allow steam from steam inlet connection 12 to pass through steam line 52 and into the open-end steam coils within chemical solution heating vat 22. When the solution within heating vat 22 has reached a predetermined temperature, heat sensing bulb 55 will close thermostatic valve 54 thereby cutting off the steam until the temperature in said vat drops to a predetermined point at which time heat sensing bulb 55 will re-open thermostatic valve 54 to allow additional steam to enter. Thus it can be seen that a relative constant temperature may be maintained within the chemical solution heating vat.

To allow visual checks as to the proper operation of the system, a heat sensing bulb 56 is provided within vat 22 and is connected to temperature gauge 57 of panel 15 by means of electrical line 56'.

Once the proper chemical concentration from chemical tank 34 is obtained within chemical solution heating vat 22, chemical concentration sensing bulb 58 will activate solution control 61 by way of electrical line 58' which in turn will by way of electrical line 30' close solenoid valve 30, thus cutting off the water supply to tank 34 to stop the flow of chemicals through line 36. Once the chemical concentration from tank 34 in vat 22 drops below the predetermined level, concentration sensing bulb 58 will activate solution control 61 to re-open solenoid 30.

When the concentration of the chemical contained in tank 35 reaches a predetermined level within vat 22, sensing bulb 59 causes solution control 62 to operate solenoid valve 31 in a manner similar to that hereinabove described for the relationship between tank 34, sensing bulb 58 and control 61.

Solution controls 61 and 62 both have means for setting the predetermined chemical concentrations at which valves 30 and 31 respectively will operate.

The electrical energy required to operate the various solenoid valves and controls of the present invention is obtained from electrical power inlet 14 which is connected to control panel 15 and its various components in the ordinary obvious manner.

The operation and control of the water softener reservoir is similar to the operation and control of the chemical solutions from tanks 34 and 35 or, as has been hereinabove described, such water softener may be controlled by other outside means.

Once the temperature and chemical solution within heating vat 22 have reached a predetermined degree and concentration, high pressure pump 23 may be activated and hand valve 46' opened to begin operation of the sanitizing process. The solution within vat 22 passes through line 21, pump 23 and line 46 to relief valve 48 from which it passes through solution line 49 and cleaning solution outlet 13 into central cleaning solution line 65 which carries said solution to various cleaning station outlets (not shown) located at various locations throughout the plant being sanitized.

If conveyors, shackles and the like are used in the food processing plant, spray headers such as those disclosed in co-pending applications, Ser. Nos. Des. 2,532, Des. 2,533, Des. 2,534, Des. 2,536 and Des. 2,537 may be used when operatively connected to the solution line at the various cleaning stations. Also for cleaning areas such as floors, walls, vats and the like which do not readily lend themselves to spray headers of the type hereinabove disclosed, a hand manipulated spray nozzle such as that shown in co-pending application Des. 2,534 may be used.

It has been found through actual experience that positive control of the detergents in a plant sanitizing operation gives consistent results as to excellency in the cleaning operation. Within one of the two chemical tanks 34 and 35 in place an alkali which in a poultry processing plant would be used primarily for shackle cleaning of the conveyor systems. In the other tank would be placed an all purpose detergent for general cleaning. In either case, the amount of chemical used to obtain maximum results has been found to be less than one-half of one percent by volume of the cleaning solution dispensed to the water carrier. It has also been found that the pressure created by high pressure pump 23 within the system should be set between 150 and 250 pounds per square inch. The exact amount of pressure may be set by controls (not shown) in the pump system.

Once the overall cleaning operation has been adequately accomplished within the plant areas being cleaned, valve 19 may be closed and valve 20 opened thereby allowing fresh water to circulate by way of line 18 into pump 23 and back through line 49 into the cleaning system thereby not only cleaning the chemical solution from the solution lines but also rinsing the entire plant area which has just been sanitized. This rinsing is not only desirable but is also required by the United States Department of Agriculture regulations when detergent cleaning has been used in a food processing plant.

Should, either during the cleaning cycle using cleaning solution or during the rinse cycle, the pressure build up within the plant system beyond a predetermined point, relief valve 48 will reduce the pressure by opening and allowing the fluid to flow through line 50 and back into the upper portion of vat 22. Although this could cause some problems in overflow during the rinse cycle when liquid is not being removed from the vat through line 21, as a practical matter, the primary danger of excessive pressure in the system will only come about during the cleaning cycle when relatively high temperatures are being used. Of course if overflow should become a problem, an overflow drain in the upper portion of vat 22 could be provided so as to eliminate all danger of flooding which might cause damage to equipment in the immediate area.

It is obvious to one skilled in the art that the present invention has the advantage of allowing accurate control of the cleaning and sterilizing chemicals in a plant sanitizing system as well as maintaining the most advantageous temperature of operation. Further, the subject of the present invention is adapted to easy installation and operation with a minimum of initial cost and later maintenance. Additionally, the subject of the present invention reduces the time and labor required in maintaining adequate sanitation in food processing plants while at the same time greatly increasing the sanitation rating by accurately controlling the factors which have hereinbefore been left to human judgment which, at best, is extremely inaccurate.

The terms "upper," "lower" and so forth have been used herein merely for convenience in the foregoing specification to describe the sanitation system and its parts as oriented in the drawings. It is to be understood, however, that these terms are in no way limiting to the invention since the various components may obviously be disposed in many different positions when in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. In a plant sanitizing system having a water inlet source and a solution outlet operatively connected to a solution distribution system, the improvement comprising: at least one chemical containing means; first means controllingly conveying water from said water inlet to said containing means; a chemical and water mixing tank; second means conveying water from said water inlet to said chemical and water mixing tank; means connecting said chemical containing means to said mixing tank; means connecting said mixing tank to a chemical solution heating container means whereby the water and chemical mixture from said mixing tank may be heated; chemical concentration sensing means located within said heating container means and operatively connected to the conveying means connecting the water inlet to the chemical containing means to allow water to enter said chemical containing means only when the chemical concentration within said heating container means is below a predetermined level whereby the chemical concentration within the heating container means may be controlled; means connecting said heating container means to said solution outlet; and means within said last mentioned means to increase the pressure of the solution passing from said outlet into said distribution system.

2. The system of claim 1 wherein the pressure of the solution introduced into said distribution system is in the range of between 150 p.s.i. and 250 p.s.i.

3. The system of claim 1 wherein the means for increasing the pressure of the solution within said distribution system is a high pressure pump.

4. The system of claim 1 wherein the means for controlling the flow of water from the water inlet to the chemical containing means is an electrically activated solenoid valve.

5. The system of claim 1 wherein the means for heating the solution heating cointainer means is steam.

6. The system of claim 1 wherein the temperature of the solution within the heating container means is maintained at approximately 180 degrees Fahrenheit.

7. The system of claim 1 wherein the chemical concentration within the heating container means is maintained at less than one-half of one percent by volume chemical composition to water.

8. The system of claim 1 wherein means are provided for closing, between the heating container means and the pressure increasing means, the means connecting the said heating container means and the solution outlet; and means for connecting the water inlet means to the pressure increasing means whereby the solution distribution system may be rinsed with water under increased pressure.

9. The system of claim 1 wherein at least one means is provided for maintaining a relatively constant volume of solution within the heating container means.

10. The system of claim 1 wherein the chemical within the chemical containing means is an all purpose detergent.

11. The system of claim 10 wherein a second chemical containing means is provided having therein an alkali and connected into the sanitizing system in the same manner as the first mentioned chemical container means.

12. The system of claim 11 wherein a third chemical containing means is provided having therein a water softener; controllable means connecting said third means to the heating container means; and chemical concentration sensing means located within said last mentioned means and operatively connected to said controlling means whereby the amount of water softener within said heating container means may be regulated.

13. In a plant sanitizing system having a water inlet source, a steam inlet source, and a solution outlet operatively connected to a solution distribution system, the improvement comprising: a first chemical containing means adapted to receive an all purpose detergent; a second chemical containing means adapted to receive an alkali; a third chemical containing means adapted to receive a water softener; first means for controllingly conveying water from said inlet to said first and second chemical containing means; a chemical and water mixing means; second means for conveying water from said water inlet to said chemical and water mixing means; means connecting said first and second chemical containing means to said mixing means; means connecting said mixing means to a chemical solution heating container means whereby the water and chemical mixture from said mixing means may be heated; means controllably connecting said third chemical containing means to said heating container means; at least three chemical concentration sensing means located in the heating container means and operatively connected, respectively, to each of the conveying means connecting the water inlet to the first and second chemical containing means and to the controllable means connecting the third chemical containing means to the heating container means whereby the chemical concentrations within the said heating container means may be controlled; means connecting said heating container means to said solution outlet pump; means within said last mentioned means to increase the pressure of the solution passing from said outlet into said distribution system; means for closing, between the heating container means and the pump means, the means connecting the heating container means to the solution outlet; and means for connecting the water inlet means to the pump means whereby the solution distribution system may be rinsed.

14. The system of claim 13 wherein the pressure of the solution introduced into the distribution system is in the range of between 150 p.s.i. and 250 p.s.i.

15. The system of claim 14 wherein the temperature of the solution within the heating container means is maintained at approximately 180 degrees Fahrenheit.

16. The system of claim 15 wherein the chemical concentration from each of the first and second chemical containing means is maintained within the heating container means at less than one-half of one percent by volume to water.

17. The system of claim 16 wherein means are provided for controllingly conveying steam from the steam inlet to the heating container means whereby the temperature of the solution within said heating container means may be raised.

18. The system of claim 17 wherein a means is provided for maintaining a relatively constant volume of solution within the heating container means.

References Cited
UNITED STATES PATENTS

| | | | |
|---|---|---|---|
| 2,487,348 | 11/1949 | Malsbary | 137—101.11 |
| 2,830,615 | 4/1958 | Borell | 137—93 |
| 2,979,066 | 4/1961 | Christie | 137—93 |
| 3,094,133 | 6/1963 | Treanor | 137—101.11 |
| 3,200,835 | 8/1965 | Farison | 137—268 |

WILLIAM F. O'DEA, Primary Examiner

WILLIAM H. WRIGHT, Assistant Examiner

U.S. Cl. X.R.

134—57, 101.11, 89, 168